Figure 1:
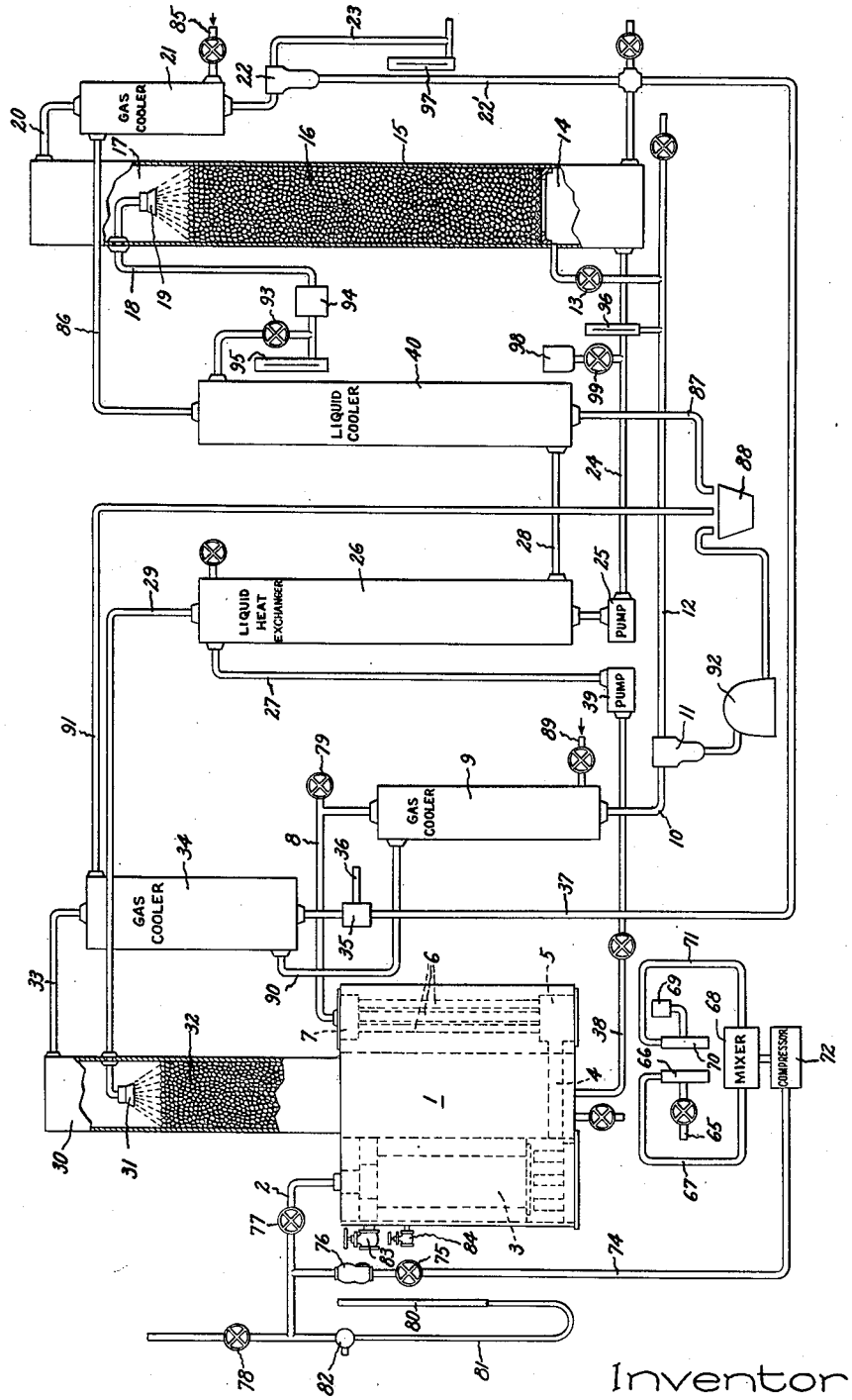

March 10, 1953  A. G. HOTCHKISS  2,631,135
APPARATUS AND METHOD FOR PRODUCING A GAS ATMOSPHERE
Filed Oct. 17, 1947  3 Sheets-Sheet 1

Inventor:
Allen G. Hotchkiss,
by Claude A. Mott
His Attorney.

Fig. 2.
Fig. 3.
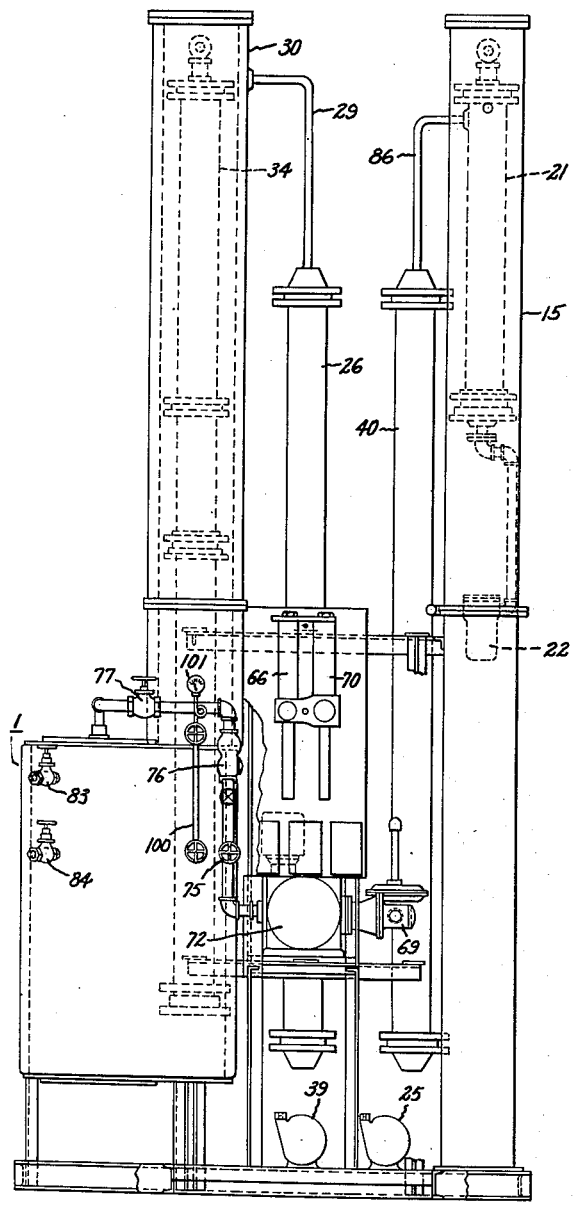
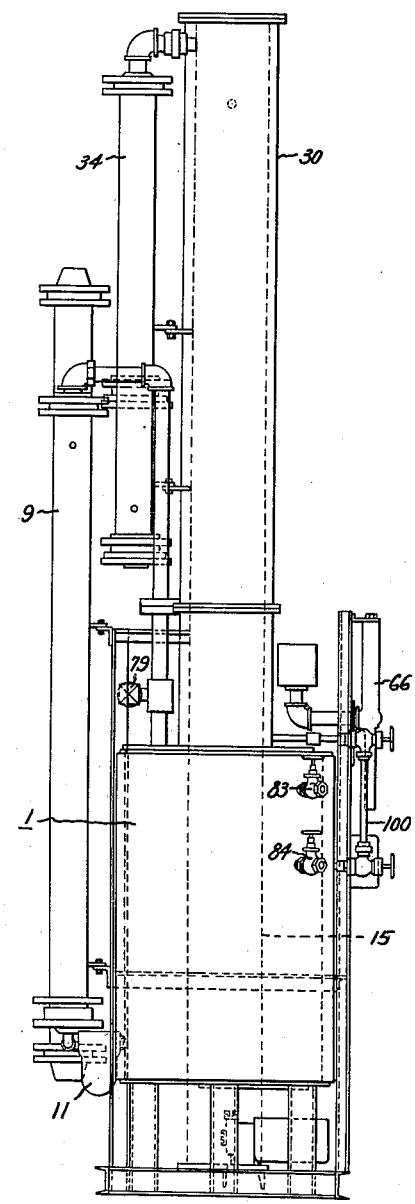
Inventor:
Allen G. Hotchkiss,
by *Claude A. Nitt*
His Attorney.

March 10, 1953 — A. G. HOTCHKISS — 2,631,135
APPARATUS AND METHOD FOR PRODUCING A GAS ATMOSPHERE
Filed Oct. 17, 1947 — 3 Sheets-Sheet 3
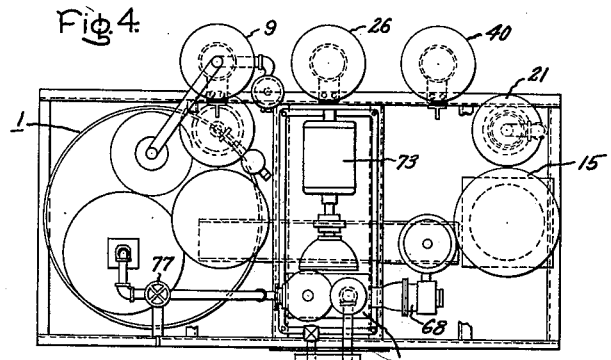
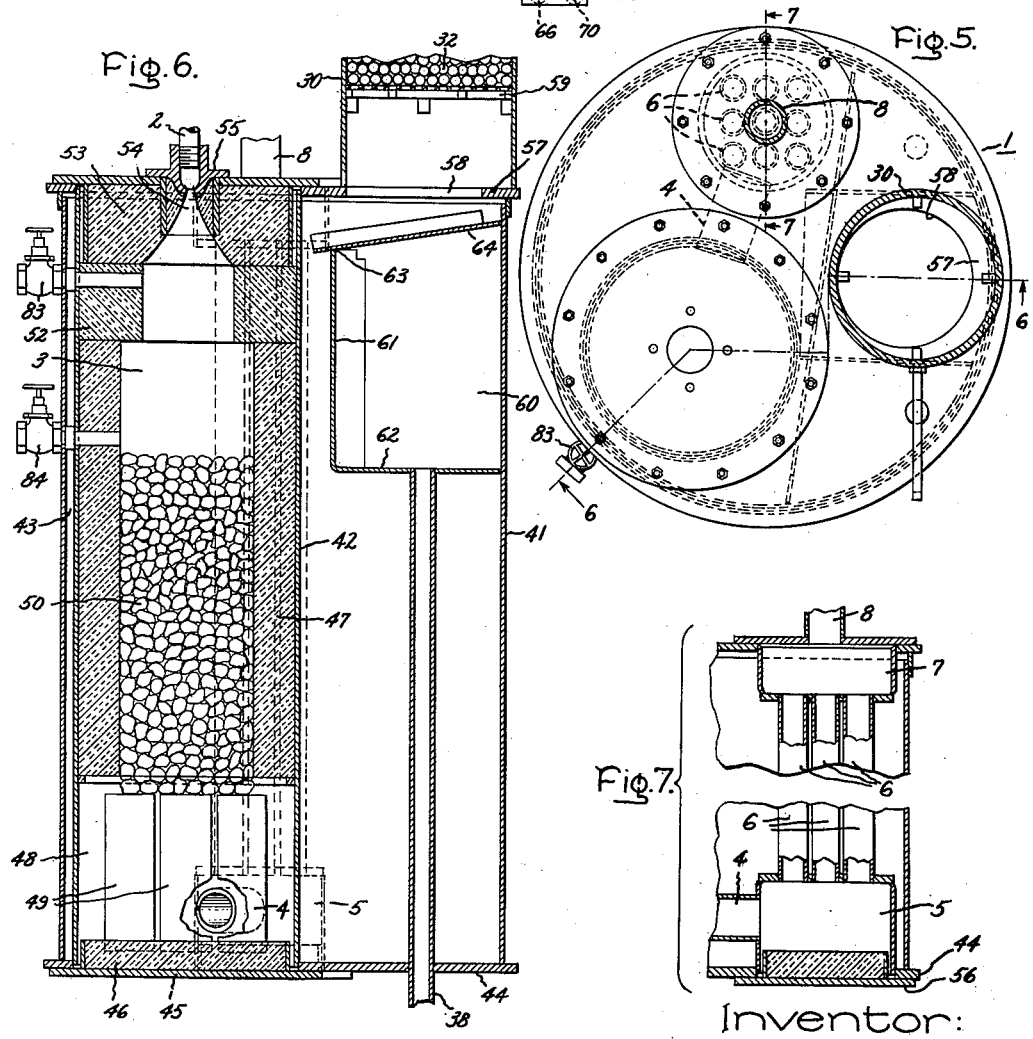
Inventor:
Allen G. Hotchkiss,
by Claude H. Mott
His Attorney.

Patented Mar. 10, 1953

2,631,135

UNITED STATES PATENT OFFICE 2,631,135

APPARATUS AND METHOD FOR PRODUCING A GAS ATMOSPHERE

Allen G. Hotchkiss, Schenectady, N. Y., assignor to General Electric Company, a corporation of New York Application October 17, 1947, Serial No. 780,482

9 Claims. (Cl. 252—376)

My invention relates to apparatus and method for producing a gas by burning a fuel gas and thereafter purifying the gaseous products of combustion for use as a neutral, non-oxidizing, or reducing atmosphere such as in the heating of metallic articles for hardening, brazing, annealing, etc., and has for its object the combination of the burning and gas-purifying operations in such manner as to utilize the heat produced in the burning of the gas during the subsequent gas-purifying operation.

Heretofore in the manufacture of furnace gases by burning a suitable fuel gas, the combustion apparatus, such as described and claimed in my Patent No. 2,085,586, dated June 29, 1937, has been separate from the purifying apparatus by means of which the carbon dioxide gas is removed and also the small amounts of sulphur dioxide and hydrogen sulphide that may be present. During the burning operation, as described in my patent, the heat of combustion is removed by cooling water, this heat being wasted. Thereafter, the gaseous products of combustion are purified by passing them in contact with a suitable absorber liquid which removes the $CO_2$ and other gases. The gas-laden absorbing liquid is then heated to a high temperature to drive off the $CO_2$ and $H_2S$ gases whereby the absorbing liquid is reactivated. This use of two separate pieces of apparatus results in the waste of the heat produced during the burning of the fuel gas, additional heat being supplied to reactivate the absorbing liquid during the gas-purifying operation.

More particularly, in accordance with my invention I combine the burning and purifying apparatus so that the heat produced during the burning of the fuel gas is utilized in the heating of the absorbing liquid for the removal of the $CO_2$ and $H_2S$ gases.

For a more complete understanding of my invention reference should be had to the accompanying drawing, Fig. 1 of which is a diagrammatic representation of apparatus for producing a gas atmosphere embodying my invention, Fig. 2 is a front elevation view of apparatus for producing a gas atmosphere embodying my invention, Fig. 3 is a side elevation view of the apparatus shown in Fig. 2, Fig. 4 is a plan view of the apparatus shown in Fig. 2, Fig. 5 is an enlarged plan view of the combustion and liquid heating apparatus, Fig. 6 is a sectional view along the line 6—6 of Fig. 5 looking in the direction of the arrows, while Fig. 7 is a sectional view along the line 7—7 of Fig. 5 looking in the direction of the arrows.

Referring to Fig. 1 of the drawing, in carrying out my invention in one form I provide a combined combustion and boiler device 1 in which the fuel gas is burned and the heat produced utilized in boiling the $CO_2$-absorbing liquid for the purpose of removing the $CO_2$ and reactivating the liquid. This device is shown in detail in Figs. 5, 6 and 7. Fuel gas is supplied at a suitable pressure through a pipe 2 into the combustion chamber 3 in the device 1 where the gas is burned, the gaseous products of combustion, i. e. burned gas, passing downward and through a pipe 4 to a lower header 5 and then upward through heating tubes 6 to an upper header 7. The combustion chamber, the pipe 4, header 5, and pipes 6 are completely surrounded by $CO_2$-absorbing liquid whereby the liquid is heated to a boiling temperature of substantially 212 degrees F. This liquid consists of a mixture of monoethanolamine and water, the percentage of monoethanolamine being preferably from 12 to 15 by volume.

From the header 7 the hot burned gas at a temperature of approximately 300 degrees F. is passed through a pipe 8 downward through a cooler 9 wherein the gas is cooled to about 80 degrees F. From the cooler 9 the gas passes through a pipe 10, a water separator 11 in which the excess moisture condensed by the cooling is separated out, and then through a pipe 12 and valve 13 to a chamber 14 in the lower end of a $CO_2$ gas-absorbing tower 15. In the tower 15 which is a closed cylindrical metal tank mounted in an upright position is a quantity of filler material 16, preferably small, short porcelain tubes known as Raschig rings, through which the $CO_2$-laden gas passes upward and by means of which the gas comes in intimate contact with the $CO_2$-absorbing liquid supplied to the chamber 17 in the top of the tower through a pipe 18 and applied to the top of the filler material by means of a suitable spray 19. This absorbing liquid in passing downward through the filler material removes substantially all of the $CO_2$ gas from the upwardly moving gas and also the relatively small amounts of sulphur dioxide and hydrogen sulphide, the gas-laden liquid collecting in the chamber 14. The gas passes out of the absorbing tower 15 through a pipe 20 downward through a cooler 21 and then through a liquid separator 22 where the liquid, water with a trace of monoethanolamine, condensed by the cooling of the gas is separated out and fed by a pipe 22' into the chamber 14. The purified gas is then passed through a pipe 23 to the heating chamber where it is utilized as a gas atmosphere either directly or, in most instances, through additional moisture removing apparatus.

The $CO_2$-laden absorbing liquid which collects in the chamber 14 is now heated in the device 1 to drive off the $CO_2$ and $H_2S$ gases, the sulphur dioxide not being removed. The liquid is removed from the chamber through a pipe 24 by means of a motor-driven pump 25 and passed upward through a liquid heat exchanger 26 in which it is heated by reactivated absorbing liquid supplied from the device 1 through a pipe 27 to the top of the heat exchanger and out of the bottom through pipe 28. From the heat exchanger 26 the $CO_2$-laden liquid passes through a pipe 29 to the upper end of the gas-separation or reactivating tower 30 which is similar in construction to the absorbing tower 15. By means of a spray head 31 connected to the pipe 29 in the top of the tower 30, the $CO_2$-laden liquid is sprayed over a mass of Raschig rings 32. As the liquid trickles down over the Raschig rings, which furnish a stripping action promoting the release of gases, the liquid is heated still further by the steam vapor arising from the quantity of boiling absorbing liquid in the device 1, the upper end of which is connected to the lower end of the tower 30. The released $CO_2$ and $H_2S$ gases pass out at the top of the tower through a pipe 33 and then through a gas cooler 34 and a liquid separator 35 where the liquid condensed out by the cooling is separated, while the gases escape to the atmosphere through the pipe 36. This liquid, which may contain a small amount of monoethanolamine, is returned by a pipe 37 back to the chamber 14.

As stated above, the reactivated hot liquid is drawn off from the bottom of the device 1 through a pipe 38 by means of a motor-driven pump 39 and fed through a pipe 27 to the heat exchanger 26. From the heat exchanger the liquid passes through the pipe 28 to a cooler 40 where its temperature is reduced to about 100 degrees F. The liquid is then passed through the pipe 18 to the absorbing tower 15 as previously described.

Referring to Figs. 5, 6 and 7, the combustion and boiler device 1 comprises an outer cylindrical metal tank or boiler 41 in which is mounted a smaller cylindrical casing or partition 42 surrounding the combustion chamber, this casing 42 being adjacent one side of the tank 41 but spaced a short distance from the wall 41, as indicated by the reference numeral 43, to provide for the circulation of absorbing liquid in the tank 41 around the combustion chamber. The tank 41 is provided with a liquid-tight bottom wall 44 which surrounds the casing 42. A liquid-tight exteriorly removable bottom wall 45 is provided for the casing 42, this wall 45 having an inner layer of heat refractory material 46 to prevent the escape of heat.

Inside the casing 42 is a cylindrical wall, or lining, 47 made of heat refractory material which terminates some distance above the lower end of the casing to form a chamber 48 for the burned gas. In this chamber 48 are a plurality of bricks 49 which are arranged in closely spaced relation so as to form supports for a mass 50 of broken pieces of fire brick treated with a suitable catalyst, such as nickel, to promote the reaction of combining the carbon with oxygen. The upper portion of the lining 47 not filled with the material 50 constitutes the combustion chamber 3, which is reduced in diameter, above the lining 47, by additional lining members 52 and 53, the member 53 forming a throat opening 54 with which communicates a nozzle 55. The gas and air mixture feed pipe 2 is connected to this nozzle.

As the gas burns in the chamber 3, the hot gaseous products of combustion pass downward into the chamber 48 and from the chamber through pipe 4 to the lower cylindrical header 5 provided at the bottom with a liquid-tight connection with the bottom wall 44. It is provided with an exteriorly removable gas-tight heat insulated bottom wall 56. From the lower header 5 the gas passes upward through the gas heat exchanger tubes, or pipes, 6, nine being shown, to the upper header 7 and then into the pipe 8.

The reactivating tower 30 is secured at its lower end to the top wall 57 of the boiler 41, an aperture 58 being provided in the wall 57 through which the reactivating tower 30 communicates with the boiler. A suitable grill support 59 is provided in the tower 30 a short distance above its lower end for the Raschig rings 32. The $CO_2$-free hot liquid drips from the Raschig rings 32 through the opening 58 into the tank 41.

For the purpose of recovering as much heat as possible from the combustion chamber 3, the boiler 41 is maintained nearly full of absorbing liquid at all times so that the liquid covers almost completely all hot surfaces of the combustion chamber and gas heat exchanger which are substantially immersed in the liquid. A very considerable amount of heat is transmitted to the liquid through the heat-refractory linings 47, 52 and 53 and the casing 42. The size of the boiler 41 is so designed with respect to the heat of combustion that the liquid in the tank is maintained at a boiling temperature of 212 degrees F. while, at the same time, liquid is withdrawn through the pipe 38 for recirculation as previously described.

To assure at least a minimum liquid level, the pipe 38 is extended upward inside of the boiler 41 to the upper part where it communicates with a liquid chamber 60 formed by a partition wall 61 extending across a segment of the tank, and a segmental bottom wall 62 secured tightly to the walls of the tank. Therefore, if liquid is withdrawn through the pipe 38 faster than it is fed to the tank from the tower 30, it will be withdrawn from the chamber 60 and the liquid level outside the chamber 60 maintained level with the top of the wall 61 at the point 63. Just below the opening 58 is a chute 64 which catches the liquid from the tower 30 and diverts it over the top of the chamber 60 into the boiler 41.

Referring again to Fig. 1, the fuel gas to be burned is fed in through a pipe 65, a flowmeter 66, and a pipe 67 to a proportioning mixer 68 while a predetermined amount of air is fed into the mixer through a strainer 69, a flowmeter 70, and a pipe 72. From the mixer 68, which comprises also a gas governor for equalizing the gas and air pressures, the mixed gas and air passes to a compressor 72 the mixer and compressor being driven by a suitable electric motor 73, as shown in Fig. 4. From the compressor the mixture at a suitable pressure such as two pounds per square inch passes through a pipe 74, a valve 75, a fire check 76, and a valve 77 to the feed pipe 2.

In starting, the valve 77 is closed and a valve 78 is opened to allow the mixture to escape to the atmosphere until the mixer 68 has been adjusted to give the desired proportions. Then the valve 78 is closed and the valve 77 opened. At this time a valve 79 is opened to prevent any excessive pressure in the pipe 8.

The gas is lighted by means of a lighter torch 80 which is connected through a rubber hose 81 and a valve 82 to the pipe 74. The valve 82 is opened and the gas lighted as it escapes from the end of the torch 80 constituting a burner. This end which is lighted should be heated to a red-hot temperature very quickly if the gas-air proportions are correct. This heating as observed by the opeartor constitutes a check on the operation of the mixer 68. A valve 83 is now opened and the heated end of the torch 80 inserted into the combustion chamber for lighting the gas, after which the torch is removed and the valve 83 closed. A second valve 84 leads into the combustion chamber and constitutes when opened a sight opening whereby the temperature and state of combustion can be observed. The outer end of this valve is closed by a heat refractory transparent material. After the gas has been lighted, the valve 79 is closed.

The apparatus is started with a predetermined amount of the absorbing liquid in the boiler 41 and the pipes. Preferably, the valve 79 remains open until the liquid in the tank 41 is heated to a boiling temperature so that the $CO_2$ gas will be driven off from any $CO_2$-laden liquid pumped from the absorbing tower 14. Then valve 79 is closed and the pumps 25 and 39 started.

Any suitable construction can be used for the coolers 9, 21, 34 and 40 and the heat exchanger 26. Preferably, these devices consist each of an outer cylindrical tank through which passes a helical coil of pipe, as disclosed in my Patent No. 2,085,587, dated June 29, 1937. In the case of the coolers, cooling water is circulated through the tank while the gas or liquid to be cooled is passed through the coil inside the tank. In the heat exchanger 26 the pipe 28 preferably leads into the coil. Cooling water is admitted through a pipe 85 to the cooler 21 and flows from the cooler through the pipe 86, the cooler 40 and pipe 87 to the sump or drain 88. In a similar manner, cooling water is supplied through a pipe 89 to the cooler 9 and from the cooler through a pipe 90, the cooler 34 and a pipe 91 to the drain 88. Liquid from the separator 11 passes through a liquid head float trap device 92 to the drain 88, the head of liquid in the device 92 being sufficient to counterbalance the gas pressure in the pipe 10.

Preferably, enough heat is produced in the combustion chamber to maintain the absorbing liquid at a boiling temperature with the liquid pumped at full volume as long as the consumption of gas from the apparatus is over fifty per cent of the maximum capacity. It will be understood that the compressor 72 maintains a constant pressure irrespective of the volume of the gas and air mixture supplied and consequently when the amount of gas taken from the pipe 23 decreases, a smaller amount of mixed air and fuel gas is supplied to the combustion chamber. When the demand decreases to fifty per cent, or below, of the maximum for the apparatus, as indicated by the flowmeters 66 and 70, a valve 93 in the pipe 18 is partly closed so as to decrease the circulation of the absorbing liquid, as indicated by a flowmeter 94. Additional checks on the operation of the apparatus are given by thermometers 95, 96 and 97, which indicate the temperature of the liquid or gas at these points.

The absorbing liquid may be replenished by means of a funnel 98 (Fig. 1) connected through a valve 99 to the pipe 24. A liquid level indicator 100 is provided on the boiler and also a pressure gauge 101. Also various normally closed valves are provided for use in draining and cleaning the apparatus.

The amount of air in the gas-air mixture supplied to the combustion chamber 3 may be varied to vary the completeness of combustion and thereby regulate the gaseous content of the gas supplied by the pipe 23. For most purposes, the apparatus is operated at approximately fifty per cent of complete combustion, giving a gas supply from the pipe 23 containing approximately ten to eleven per cent carbon monoxide, eighteen to twenty per cent hydrogen, and one and one-half per cent methane, the remainder being nitrogen. When the apparatus is operated at almost complete combustion, the amounts of hydrogen and carbon monoxide are low and may be less than one per cent.

What I claim as new and desire to secure by Letters Patent of the United States is:

1. An apparatus for producing a gas substantially free of carbon dioxide comprising, a boiler unit having a partition wall separating the combustion chamber portion from the liquid chamber portion thereof, means for supplying to said combustion chamber a fuel gas mixed with an amount of air sufficient to provide only partial combustion of said fuel gas, pipe means through said partition wall connecting said combustion chamber to a plurality of heat exchange tubes within said liquid chamber whereby the combusted gases produced in said combustion chamber are passed in heat exchange relationship with a carbon dioxide absorbent liquid in said liquid chamber to produce boiling thereof, a reactivating tower positioned above said liquid chamber and arranged to discharge into said liquid chamber, a carbon dioxide absorbing device, means for passing the combusted gases from said heat exchange tubes through said absorbing device, means for passing the absorbent liquid from said boiler through said absorbing device whereby the liquid absorbs the carbon dioxide in said combusted gases, and means for transferring the carbon dioxide laden absorbent liquid from said absorbing device and inserting it into the upper portion of said reactivating tower whereby the carbon dioxide laden liquid flows downwardly in said reactivating tower into said boiler chamber and is heated by vapor from said boiler to release carbon dioxide gas.

2. Apparatus for producing a gas comprising, a boiler unit having a partition wall separating the combustion chamber portion from the liquid chamber portion thereof, pipe means through said partition wall connecting said combustion chamber to a plurality of heat exchange tubes within said liquid chamber whereby combusted gases produced in said combustion chamber are passed in heat exchange relationship with an absorbent liquid in said liquid chamber portion to produce boiling thereof, a reactivating tower above said liquid chamber arranged to discharge into said liquid chamber, a gas absorbing device, means for passing combusted gases from said heat exchange tubes through said gas absorbing device, means for passing absorbent liquid from said boiler through said gas absorbing device whereby said liquid absorbs one of the gas components of said combusted gases, and means for transferring the absorbent liquid containing said one gas from said absorbing device and inserting it into the upper portion of said reactivating tower whereby the gas laden liquid flows downwardly in said reactivating tower into said boiler chamber and is heated by vapor from said boiler to release said one gas.

3. A gas producing apparatus comprising a boiler unit having a partition wall separating the combustion chamber portion from the liquid chamber portion thereof, the liquid in the liquid chamber portion substantially surrounding said combustion chamber, means for supplying continuously to the upper portion of said combustion chamber a combustible mixture of gases, pipe means extending through said partition wall from the lower portion of said combustion chamber, a plurality of heat exchange tubes within said liquid chamber portion whereby the combusted gases produced in said combustion chamber are passed in heat exchange relationship with an incoming absorbent liquid, a reactivating tower positioned above said liquid chamber and arranged to discharge liquid into said liquid chamber, an absorbing tower, conduit means for transferring said combusted gases from said heat exchange tubes and passing them upwardly through said absorbing tower, means for transferring said absorbent liquid from said boiler and passing it downwardly through said absorbing tower whereby said liquid absorbs one gaseous component of said combusted gases, and means for transferring the gas laden absorbent liquid from the bottom of said absorbing tower and passing it into the upper portion of said reactivating tower whereby the gas laden absorbent liquid flows downwardly in said reactivating tower into said boiler chamber and is heated by vapor from said boiler to release said one gaseous component.

4. An apparatus for producing a gas substantially free of carbon dioxide comprising, a boiler unit having a partition wall separating the combustion chamber portion thereof from the liquid chamber portion, the liquid in said liquid chamber portion substantially surrounding said combustion chamber portion, means for supplying continuously to the upper portion of said combustion chamber a hydrocarbon gas mixed with an ammount of air sufficient to provide only partial combustion of said hydrocarbon gas, pipe means connecting the lower portion of said combustion chamber to a plurality of heat exchange tubes within said liquid chamber portion whereby the combusted gases produced in said combustion chamber are passed in heat exchange relationship with a carbon dioxide absorbent liquid in the liquid chamber, a reactivating tower positioned above said liquid chamber and arranged to discharge into said liquid chamber, a carbon dioxide absorbing device, means for transferring said combusted gases from said heat exchange tubes and passing them through said absorbing device, means for transferring said absorbent liquid from said boiler and passing it through said absorbing device whereby said liquid absorbs the carbon dioxide in said combusted gases, and means for transferring the absorbing liquid containing carbon dioxide from said absorbing device and passing the heated carbon dioxide laden absorbent liquid into the upper portion of said reactivating tower whereby such liquid flows downwardly in said reactivating tower into said boiler chamber and is heated by vapor from said boiler to release carbon dioxide gas.

5. An apparatus for producing a gas consisting mainly of nitrogen and containing substantial amounts of carbon monoxide and hydrogen but substantially free of carbon dioxide comprising, an enclosed boiler unit having a combustion chamber portion separated by a partition from a liquid chamber portion, the liquid in said liquid chamber portion substantially surrounding said combustion chamber portion, means for supplying continuously to the upper portion of said combustion chamber a hydrocarbon gas mixed with an amount of air sufficient to provide only partial combustion of said hydrocarbon gas, a plurality of heat exchange tubes in vertically disposed relation within said liquid chamber, a discharge pipe extending through said partition wall and connecting the lower portion of said combustion chamber to said tubes whereby the combusted gases produced in said combustion chamber are passed in heat exchange relationship with an incoming carbon dioxide absorbent liquid, a reactivating tower positioned in vertically disposed relation above said boiler and discharging directly into said liquid chamber through an opening in the top thereof, a vertically disposed carbon dioxide absorbing tower, means for transferring said combusted gases from said heat exchange tubes and passing them upwardly through said absorbing tower, means for transferring said absorbent liquid from said boiler and passing it downwardly through said absorbing tower whereby said liquid absorbs the carbon dioxide in said combusted gases, outlet means for the carbon dioxide free gas connected to said absorbing tower, means for transferring the carbon dioxide laden absorbing liquid from the bottom of said absorbing tower and passing it downwardly through said reactivating tower whereby such liquid flows through said reactivating tower and is discharged into said liquid chamber, said carbon dioxide laden absorbent liquid being heated by vapor from said boiler to release the carbon dioxide gas, and outlet means for removing the carbon dioxide gas from said reactivating chamber.

6. A gas burning and purifying apparatus for producing a gas consisting mainly of hydrogen and containing substantial amounts of carbon monoxide and hydrogen but substantially free of carbon dioxide, comprising an enclosed boiler unit having therein a cylindrical wall forming a combustion chamber mounted in vertically disposed relation in position to be substantially surrounded by a liquid in said boiler, a heat refractory lining within said cylindrical wall, a quantity of pieces of refractory material within said refractory lining treated with a catalyst material to promote the combination of carbon with oxygen, support means for said catalyst material near the bottom of said combustion chamber, means for supplying to the top of said combustion chamber a fuel gas under predetermined pressure and mixed with a predetermined amount of air sufficient to provide only partial combustion in said combustion chamber, a discharge pipe opening below said support means extending through the said cylindrical wall, a plurality of vertically disposed heat exchange tubes within the liquid chamber portion of said boiler unit, said pipe being connected to the lower end of said tubes whereby the burned gases produced in said combustion chamber are passed in heat exchange relationship with a carbon dioxide absorbent liquid comprising a mixture of monoethanolamine and water, a reactivating tower having a mass of filler material therein mounted on said boiler above said liquid chamber and arranged to discharge liquid into said liquid chamber through an opening in the top thereof, the heat from the burned gases passing through said heat exchanger tubes heating the liquid in said liquid chamber to a boiling temperature whereby the steam therefrom passes upwardly through said filler material in said reactivating tower, a first gas cooler, a gas absorbing tower containing a mass of filler material and provided with a liquid collecting chamber below said filler material, means for passing the burned gases from said heat exchanger tubes in the boiler chamber through said first gas cooler and then upwardly through said filler material in said absorbing tower, a liquid heat exchanger, a liquid cooler, duct and pump means for continuously passing liquid at a predetermined rate from the bottom of said liquid chamber through said liquid heat exchanger and then through said liquid cooler and into the upper end of said absorbing tower whereby the liquid flows downwardly over said filler material absorbing carbon dioxide from said burned gases and collecting in said liquid collecting chamber, duct means for conveying the purified gas from the upper end of said absorbing tower, duct and pump means for passing the carbon dioxide laden liquid from said liquid collecting chamber through said liquid heat exchanger where it is heated by the hot liquid passing therethrough from the boiler to the absorbing tower and then passing said carbon dioxide laden liquid into the top of said reactivating tower whereby said liquid flows downwardly over the filler material in said tower into said boiler chamber and is heated by said steam from said boiler to release carbon dioxide gas, a second gas cooler, duct means for passing carbon dioxide gas from the top of said reactivating tower through said second gas cooler to the outside atmosphere, and duct means for returning to said liquid collecting chamber liquid condensed from said carbon dioxide gas in said second cooler.

7. The process of producing a gas substantially free from carbon dioxide which comprises, supplying a mixture of a fuel gas and air sufficient to provide only partial combustion of said fuel gas to a jacketed combustion chamber enclosed within a boiler unit, burning said mixture in said combustion chamber, removing the combusted gases from said combustion chamber and passing them through a plurality of heat exchange tubes in the liquid chamber portion of said boiler unit whereby heat is transferred to a carbon dioxide absorbent liquid in said chamber, this heat producing boiling of said liquid whereby vapor is given off, removing said combusted gases from said heat exchanger tubes and passing them through an absorbing device, removing said liquid from said liquid chamber and passing it through said absorbing device whereby it absorbs substantially all of the carbon dioxide in said combusted gases, and removing the carbon dioxide laden absorbent liquid from said absorbing device and introducing it into a reactivating tower above the boiler whereby it passes downwardly through said reactivating tower and is discharged into said liquid chamber, said carbon dioxide being released from the absorbent liquid in said reactivating tower by the action of said vapor from said liquid chamber.

8. The process of producing a gas substantially free from carbon dioxide which comprises, supplying a mixture of fuel gas and air sufficient to provide only partial combustion of said fuel gas to a jacketed combustion chamber having an internal lining of heat refractory material and enclosed within a boiler unit, burning said mixture in said combustion chamber in the presence of a catalyst, removing the combusted gases from the bottom of said combustion chamber and passing them upwardly through a plurality of heat exchange tubes in the liquid chamber portion of said boiler unit whereby heat is transferred to a carbon dioxide absorbent liquid in said chamber, said heat producing boiling of said liquid whereby vapor is given off, removing said combusted gases from the heat exchanger tubes and passing them upwardly through an absorbing tower, removing said liquid from the bottom of said boiler chamber and passing it through a liquid heat exchanger, thereafter passing the liquid from the boiler chamber downwardly through said absorbing tower whereby it absorbs substantially all of the carbon dioxide in said combusted gases, removing the carbon dioxide laden absorbent liquid from the bottom of said absorbing tower and passing it through said heat exchanger whereby it absorbs some of the heat from the liquid passing from said boiler to said absorbing tower, and thereafter introducing the carbon dioxide laden liquid into a reactivating tower above the boiler whereby it passes downwardly through said reactivating tower and is discharged into said liquid chamber, carbon dioxide being released from said absorbent liquid in said reactivating tower by the action of said vapor from the liquid chamber.

9. The process of producing a gas consisting mainly of nitrogen and containing substantial amounts of carbon monoxide and hydrogen but substantially free of carbon dioxide which comprises, supplying a fuel gas under predetermined pressure and mixed with a predetermined amount of air sufficient to provide only partial combustion to the upper portion of a metal jacketed combustion chamber having an internal refractory lining and enclosed within a boiler unit, burning said mixture in said combustion chamber in the presence of a quantity of pieces of refractory material treated with a catalyst material to promote the combination of carbon with oxygen, removing the combusted gases from the bottom of said combustion chamber and passing them upwardly through a plurality of vertically disposed heat exchanger tubes in the liquid chamber portion of said boiler unit whereby a portion of the heat contained in said combusted gases is transferred to a carbon dioxide absorbent liquid in said chamber comprising a mixture of monoethanolamine and water producing boiling of said liquid and giving off steam, removing said combusted gases from said heat exchanger tubes and passing them through a cooler and thereafter passing them upwardly through an absorbing tower containing a mass of filler material, removing said liquid from the bottom of said boiler chamber and passing it through a liquid heat exchanger and a liquid cooler and thereafter passing it downwardly through said absorbing tower over the filler material therein whereby it absorbs substantially all of the carbon dioxide in said combusted gases, removing the purified combusted gases from the top of said absorbing towever, removing the carbon dioxide laden absorbent liquid from the bottom of said absorbing tower and passing it through said liquid heat exchanger whereby it absorbs a portion of the heat from the liquid being transferred from the boiler chamber to the absorbing tower, thereafter introducing said carbon dioxide laden liquid into the top of a reactivating tower having a mass of filler material therein located above said boiler whereby such liquid passes downwardly through said reactivating tower and is discharged into said liquid chamber, carbon dioxide being released from the absorbent liquid by the action of said steam from said liquid chamber, removing said released carbon dioxide from said reactivating chamber and cooling it to reclaim absorbent liquid therefrom, and returning such reclaimed liquid to the bottom of said absorbing tower.

ALLEN G. HOTCHKISS.

REFERENCES CITED

The following references are of record in the file of this patent:

UNITED STATES PATENTS

| Number | Name | Date |
| --- | --- | --- |
| 963,586 | Knowles | July 5, 1910 |
| 1,458,595 | Riedel | July 12, 1923 |
| 1,687,229 | Riedel | Oct. 9, 1928 |
| 2,314,827 | Hortvet | Mar. 23, 1943 |